US009310557B2

(12) United States Patent
Fukuda et al.

(10) Patent No.: US 9,310,557 B2
(45) Date of Patent: Apr. 12, 2016

(54) HEAT TREATMENT DEVICE FOR OPTICAL FIBER REINFORCING MEMBER, OPTICAL FIBER FUSION SPLICER PROVIDED WITH SAME HEAT TREATMENT DEVICE, AND METHOD FOR HEAT TREATING OPTICAL FIBER REINFORCING MEMBER

(71) Applicant: SEI Optifrontier Co., Ltd., Yokohama-shi, Kanagawa (JP)

(72) Inventors: Masakazu Fukuda, Yokohama (JP); Kensuke Ito, Yokohama (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/419,011

(22) PCT Filed: Jul. 25, 2013

(86) PCT No.: PCT/JP2013/070170
§ 371 (c)(1),
(2) Date: Feb. 2, 2015

(87) PCT Pub. No.: WO2014/021185
PCT Pub. Date: Feb. 6, 2014

(65) Prior Publication Data
US 2015/0168649 A1 Jun. 18, 2015

(30) Foreign Application Priority Data
Aug. 3, 2012 (JP) .................................. 2012-172615

(51) Int. Cl.
*H05B 1/02* (2006.01)
*G02B 6/255* (2006.01)
(52) U.S. Cl.
CPC ............ *G02B 6/2558* (2013.01); *G02B 6/2551* (2013.01)

(58) Field of Classification Search
CPC .... G02B 6/2558; G02B 6/2551; G02B 6/255; G02B 6/38; G02B 6/3801; H05B 1/023; H05B 1/0028; H05B 1/026
USPC ................. 219/494, 497, 501, 506, 505, 383; 385/99, 96, 80, 78; 65/501, 488
See application file for complete search history.

(56) References Cited

U.S. PATENT DOCUMENTS

| 4,901,506 A | * | 2/1990 | Weyandt | ................. | B29C 65/18 |
| | | | | | 219/110 |
| 6,148,258 A | * | 11/2000 | Boisvert | ................. | F02P 19/022 |
| | | | | | 123/145 A |

(Continued)

FOREIGN PATENT DOCUMENTS

| JP | 2001-150548 A | 6/2001 |
| JP | 2005-148278 A | 6/2005 |

(Continued)

*Primary Examiner* — Mark Paschall
(74) *Attorney, Agent, or Firm* — Drinker Biddle & Reath LLP

(57) ABSTRACT

A heating device for heating an optical fiber reinforcing member includes fiber holders to hold optical fibers covered with the reinforcing member at a fusion-spliced portion, a heater to heat the reinforcing member, a power supply unit to apply a voltage to the heater, and a controller to control the application of a voltage from the power supply unit to the heater. The controller includes a detecting unit that detects a parameter for determining the amount of heat generation of the heater, a storage unit that stores a plurality of heating conditions that vary depending on the parameter value, and a condition instruction unit that selects any of the plurality of heating conditions in accordance with the parameter value detected by the detecting unit and instructs the power supply unit to apply a voltage to the heater on the basis of the selected heating condition.

9 Claims, 7 Drawing Sheets

(56) References Cited

U.S. PATENT DOCUMENTS

| | | | |
|---|---|---|---|
| 6,696,676 B1 * | 2/2004 | Graves | F24C 7/087 219/492 |
| 6,995,965 B2 * | 2/2006 | Hameed | D06F 58/28 34/595 |
| 8,988,050 B2 * | 3/2015 | Newman, Jr. | H02M 7/06 323/239 |
| 2009/0052846 A1 * | 2/2009 | Miyamori | G02B 6/2558 385/96 |
| 2012/0243838 A1 * | 9/2012 | Sato | G02B 6/2558 385/96 |

FOREIGN PATENT DOCUMENTS

| | | |
|---|---|---|
| JP | 2007-310080 A | 11/2007 |
| JP | 4165375 B2 | 10/2008 |
| JP | 2010-249887 A | 11/2010 |
| JP | 2011-133838 A | 7/2011 |

* cited by examiner

HEAT TREATMENT DEVICE FOR OPTICAL FIBER REINFORCING MEMBER, OPTICAL FIBER FUSION SPLICER PROVIDED WITH SAME HEAT TREATMENT DEVICE, AND METHOD FOR HEAT TREATING OPTICAL FIBER REINFORCING MEMBER

TECHNICAL FIELD

The present invention relates to a heating device for an optical fiber reinforcing member, an optical fiber fusion splicer including the heating device, and a method for heating the optical fiber reinforcing member. The heating device heats and shrinks the reinforcing member protecting a fusion-spliced portion of optical fibers to reinforce the fusion-spliced portion.

BACKGROUND ART

Japanese Patent No. 4165375 describes a heating device that heats and shrinks a reinforcing member protecting a fusion-spliced portion of optical fibers to reinforce the fusion-spliced portion. The heating device includes a heating unit (heater) formed by a planar heating element which is bent to have a substantially U-shaped cross section. The planar heating element has a central heating portion which is a U-shaped bottom portion in surface contact with the reinforcing member held therein, and side heating portions which are both side portions not in contact with the reinforcing member. The heating temperature of the side heating portions is lower than that of the central heating portion.

To shorten the time to heat the reinforcing member, it has been recently required, for example, to reduce the thermal capacity by using a planar heating element as a heater as in Japanese Patent No. 4164375, or to set the heating temperature to a high value. However, using a planar heating element reduces the amount of heat generated by the heater per unit time and increases the time to reach a desired heating temperature.

The lower the voltage applied to the heating device, the smaller the amount of heat generated by the heater per unit time. Therefore, when the voltage applied to the heating device is low, it is necessary to increase the heat generating time of the heater to achieve a desired heating temperature. This results in an increase in the amount of power consumed by the heater to heat one reinforcing member. If the heater is supplied with power from a battery, the battery may be exhausted before completion of the heating process.

SUMMARY OF INVENTION

Technical Problem

An object of the present invention is to provide a heating device for an optical fiber reinforcing member, the heating device being capable of setting an optimum heating condition in accordance with a voltage applied to a heater, an optical fiber fusion splicer including the heating device, and a method for heating the optical fiber reinforcing member.

Solution to Problem

A heating device for an optical fiber reinforcing member is provided to achieve the object described above. The heating device includes (1) a fiber holder configured to hold optical fibers covered with the reinforcing member at a fusion-spliced portion, (2) a heater configured to heat the reinforcing member, (3) a power supply unit configured to apply a voltage to the heater, and (4) a controller configured to control the voltage, the controller including a detecting unit that detects a parameter for determining the amount of heat generation of the heater, a storage unit that stores a plurality of heating conditions, and a condition instruction unit that selects any of the plurality of heating conditions in accordance with a value of the parameter and instructs the power supply unit to apply a voltage to the heater on the basis of the selected heating condition.

In the heating device of the present invention, the parameter for determining the amount of heat generation of the heater may be a voltage applied to the heater. The heating device of the present invention may further include cooling means for cooling the heater. The heating condition may include, in sequence, a condition in a voltage application step of applying a voltage to the heater, a condition in a no-voltage application step of applying no voltage to the heater to allow natural cooling of the reinforcing member, and a condition in a cooling step of forcibly cooling the reinforcing member with the cooling means.

As another embodiment of the present invention, an optical fiber fusion splicer including the heating device of the present invention is provided.

A heating method for heating an optical fiber reinforcing member according to the present invention is a reinforcing member heating method in which, after optical fibers are fusion-spliced together, the reinforcing member covering the fusion-spliced portion of the optical fibers is heated by a heater to reinforce the fusion-spliced portion. The heating method includes applying a voltage to the heater on the basis of any of a plurality of heating conditions, detecting a parameter for determining the amount of heat generation of the heater, selecting any of the plurality of heating conditions in accordance with a value of the detected parameter, and applying a voltage to the heater on the basis of the selected heating condition so as to heat and reinforce the reinforcing member. In the heating method of the present invention, the parameter for determining the amount of heat generation of the heater preferably includes a voltage applied to the heater.

Advantageous Effects of Invention

In the present invention, the heater is heated on the basis of a heating condition selected from a plurality of different heating conditions in accordance with a value of the parameter obtained from the detecting unit. Therefore, it is possible to optimize the heating condition for the reinforcing member in accordance with various parameters, including a voltage applied to the heating device.

DESCRIPTION OF EMBODIMENTS

Figure 1:
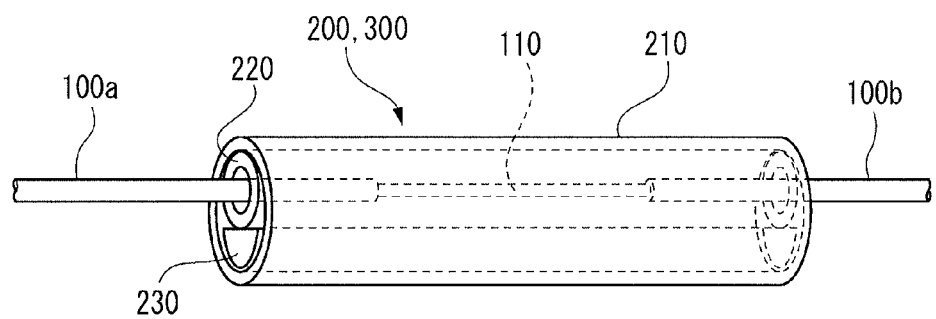
FIG. 1 is a conceptual diagram illustrating an optical fiber reinforcing member to be processed by a heating device of the present invention, with optical fibers passed through the optical fiber reinforcing member.

Embodiments of the present invention will now be described with reference to the drawings. The drawings are provided for illustrative purposes and are not intended to limit the scope of the invention. To avoid repetitive description, the identical reference numerals denote the same parts throughout the drawings. The drawings are not necessarily accurately drawn to scale.

Figure 2:
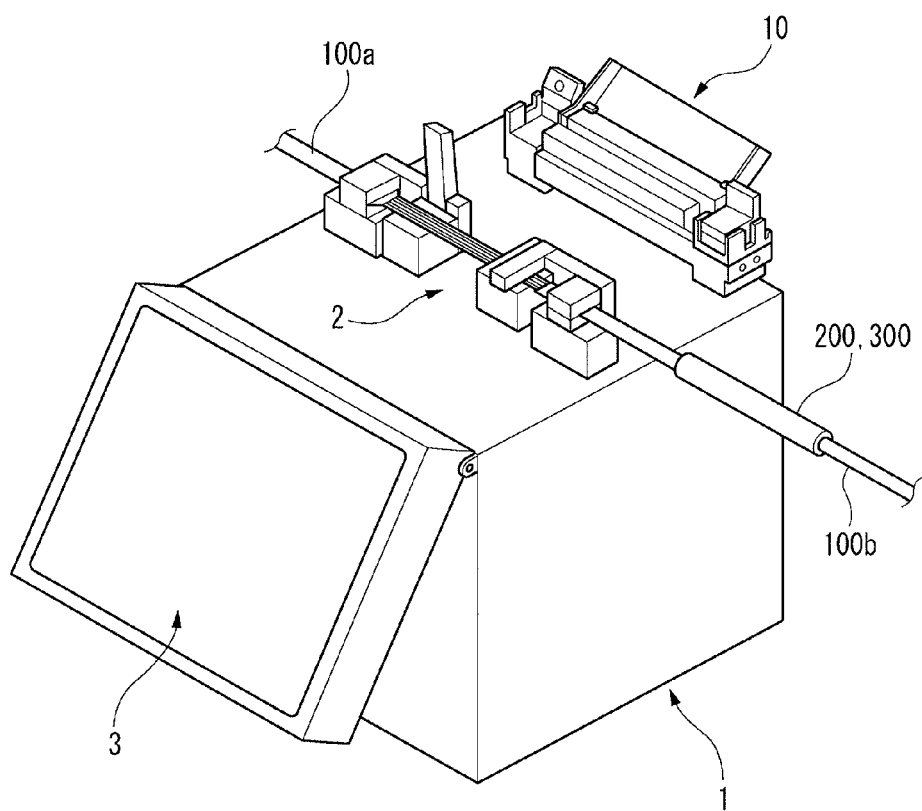
FIG. 2 is a perspective view illustrating an optical fiber fusion splicer having a heating device according to an embodiment of the present invention mounted thereon, with the optical fibers placed on the optical fiber fusion splicer.

First, a description will be given of an optical fiber fusion splicing process performed by an optical fiber fusion splicer according to an embodiment of the present invention, and an optical fiber reinforcing member heating process performed by a heating device according to an embodiment of the present invention. FIG. 1 is a conceptual diagram illustrating a reinforcing member 200 to be processed by a heating device of the present invention, with optical fibers passed through the reinforcing member 200. FIG. 2 is a perspective view illustrating a fusion splicer 1 having a heating device 10 according to an embodiment of the present invention mounted thereon, with optical fibers placed on the fusion splicer 1.

For fusion splicing of optical fibers, as illustrated in FIG. 1, an outer coating of each of single-core optical fibers 100a and 100b is removed at an end to expose a bare fiber portion. Next, with the optical fiber 100b inserted in the reinforcing member 200, the optical fibers 100a and 100b are placed in a fusion mechanical unit 2 of the fusion splicer 1 (see FIG. 2). Next, the bare fiber portions exposed at ends of the optical fibers 100a and 100b are fusion-spliced together by arc discharge or the like to form a fusion-spliced portion 110. The state of fusion-splicing is sequentially monitored by a monitoring device 3.

Then, the spliced optical fibers 100a and 100b are removed from the fusion mechanical unit 2, and the reinforcing member 200 is moved to cover the fusion-spliced portion 110 (see FIG. 1). Next, the reinforcing member 200 is placed in the heating device 10 disposed next to the fusion mechanical unit 2, and is subjected to a predetermined heating process. Thus, the reinforcing member 200 is heated and shrunk, so that the spliced portion of the optical fibers 100a and 100b is reinforced.

As illustrated in FIG. 1, the reinforcing member 200 is preferably formed by a heat-shrinkable protective tube 210. The reinforcing member 200 may include a hot-melt adhesive tube 220 into which the fusion-spliced portion 110 is inserted, and a tensile strength body 230 that reinforces the fusion-spliced portion 110 to prevent it from being bent.

Figure 3:
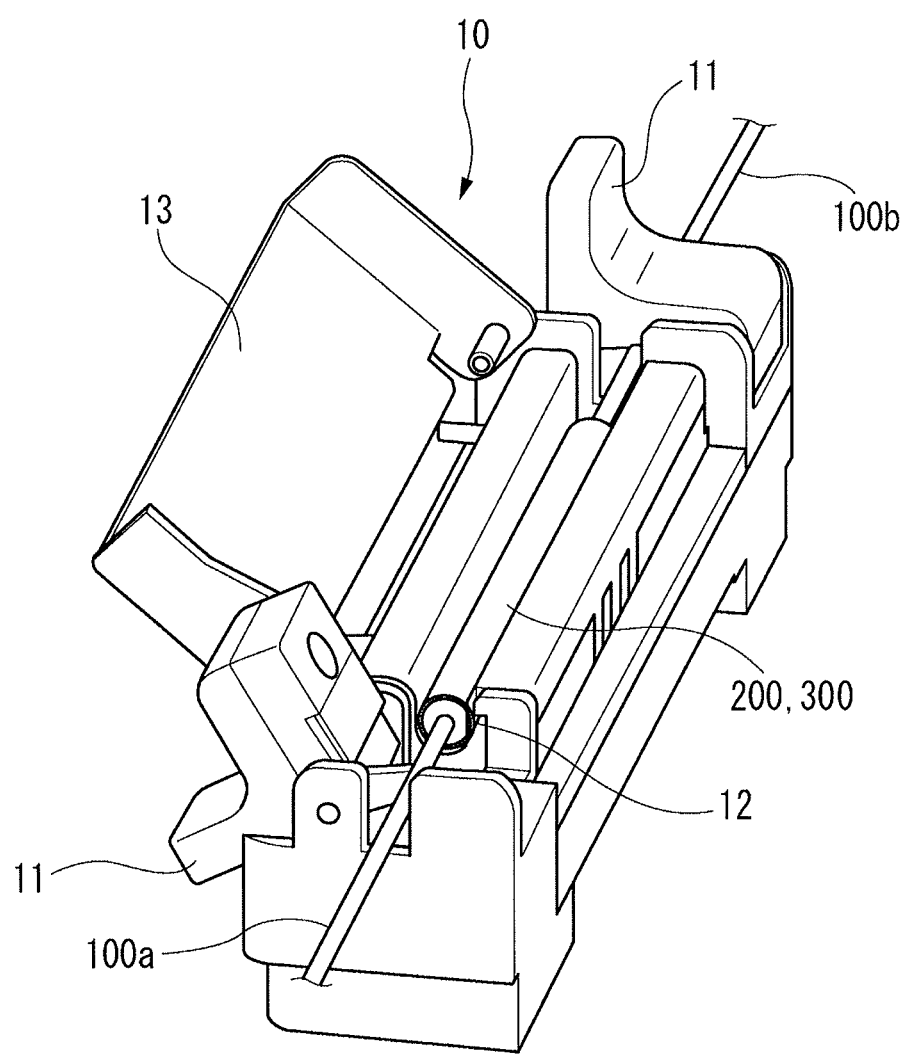
FIG. 3 is a perspective view illustrating the heating device according to the embodiment of the present invention, with the optical fibers held therein.
Figure 4:
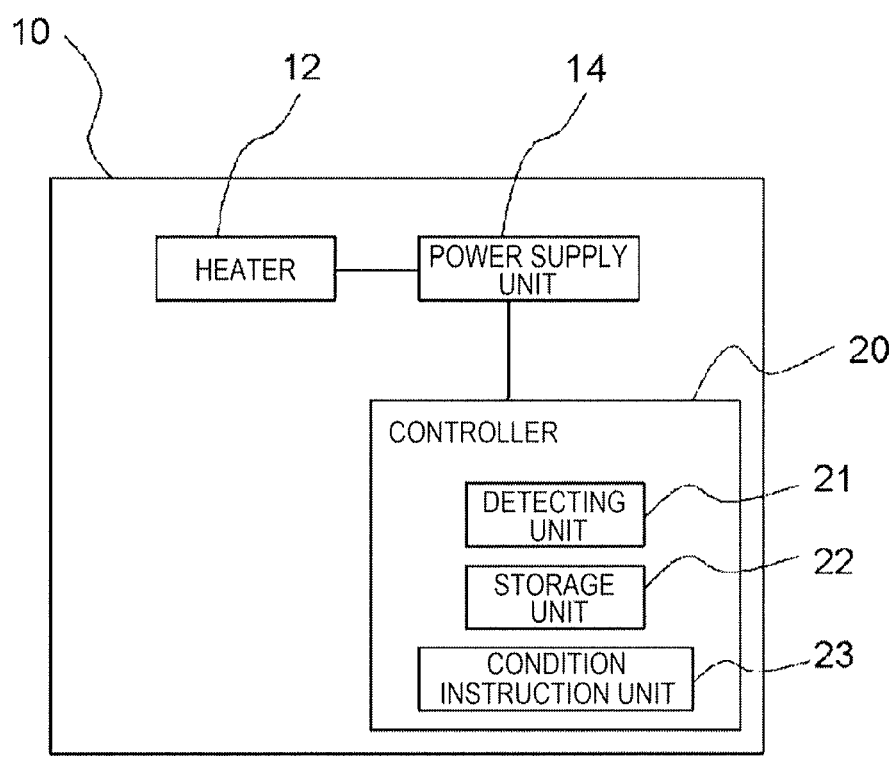
FIG. 4 is a block diagram illustrating an example of the heating device according to the present invention.

FIG. 3 is a perspective view illustrating the heating device 10 according to the embodiment of the present invention, with the optical fibers held therein. FIG. 4 is a block diagram of the heating device 10. The heating device 10 mounted on the fusion splicer 1 includes a pair of fiber holders 11 capable of holding the optical fibers 100a and 100b, a heater 12 capable of heating the reinforcing member 200, and a cover 13.

The pair of fiber holders 11 is rotatably mounted in the heating device 10. The fiber holders 11 are configured to hold the respective optical fibers 100a and 100b connected to both ends of the fusion-spliced portion 110. The heater 12 is disposed between the fiber holders 11. The heater 12 is formed by a planar heating element which is bent to have a U-shaped cross section. The reinforcing member 200 that covers the fusion-spliced portion 110 is held inside the U-shaped planar heating element. The heater may be a long plate-like member on which the fusion-spliced portion 110 is placed. The cover 13 is openably and closably provided on the upper side of the heater 12 to prevent the heater 12 from being touched by hands or to prevent the heating environment from being changed by outside air during the heating process.

As illustrated in FIG. 4, the heating device 10 further includes a power supply unit 14 and a controller 20. The power supply unit 14 is electrically connected to the heater 12, and applies a predetermined voltage to the heater 12 to heat the heater 12. The controller 20 controls the heating condition under which the reinforcing member 200 covering the fusion-spliced portion 110 is heated by the heater 12. The controller 20 includes a detecting unit 21, a storage unit 22, and a condition instruction unit 23. Here, the heating condition refers to a set of heating temperatures and heating times of the heater 12, and is stored in the form of a table for various reinforcing members 200.

After a heating switch (not shown) for starting the process of heating the reinforcing member 200 is turned on, the detecting unit 21 detects, as a parameter for determining the amount of heat generation of the heater 12, a voltage applied from the power supply unit 14 to the heater 12. For example, if the detected voltage is high, it can be determined that the amount of heat generation of the heater 12 is large; whereas if the detected voltage is low, it can be determined that the amount of heat generation of the heater 12 is small. As a parameter for determining the amount of heat generation of the heater 12, the detecting unit 21 may detect a supply voltage of the power supply unit 14, instead of a voltage applied to the heater 12.

The storage unit 22 stores a plurality of heating conditions for heating the reinforcing member 200 that vary depending on the voltage applied to the heater 12 or the supply voltage of the power supply unit 14. The storage unit 22 may store a plurality of heating conditions that vary depending on the material or thickness of the reinforcing member 200, or on the outer diameter or type of the bare fiber portions of the optical fibers 100a and 100b. The condition instruction unit 23 selects any of a plurality of heating conditions in the storage unit 22 in accordance with the amount of heat generation of the heater 12 detected by the detecting unit 21, and instructs the power supply unit 14 to apply a voltage to the heater 12 on the basis of the selected heating condition.

Figure 5:
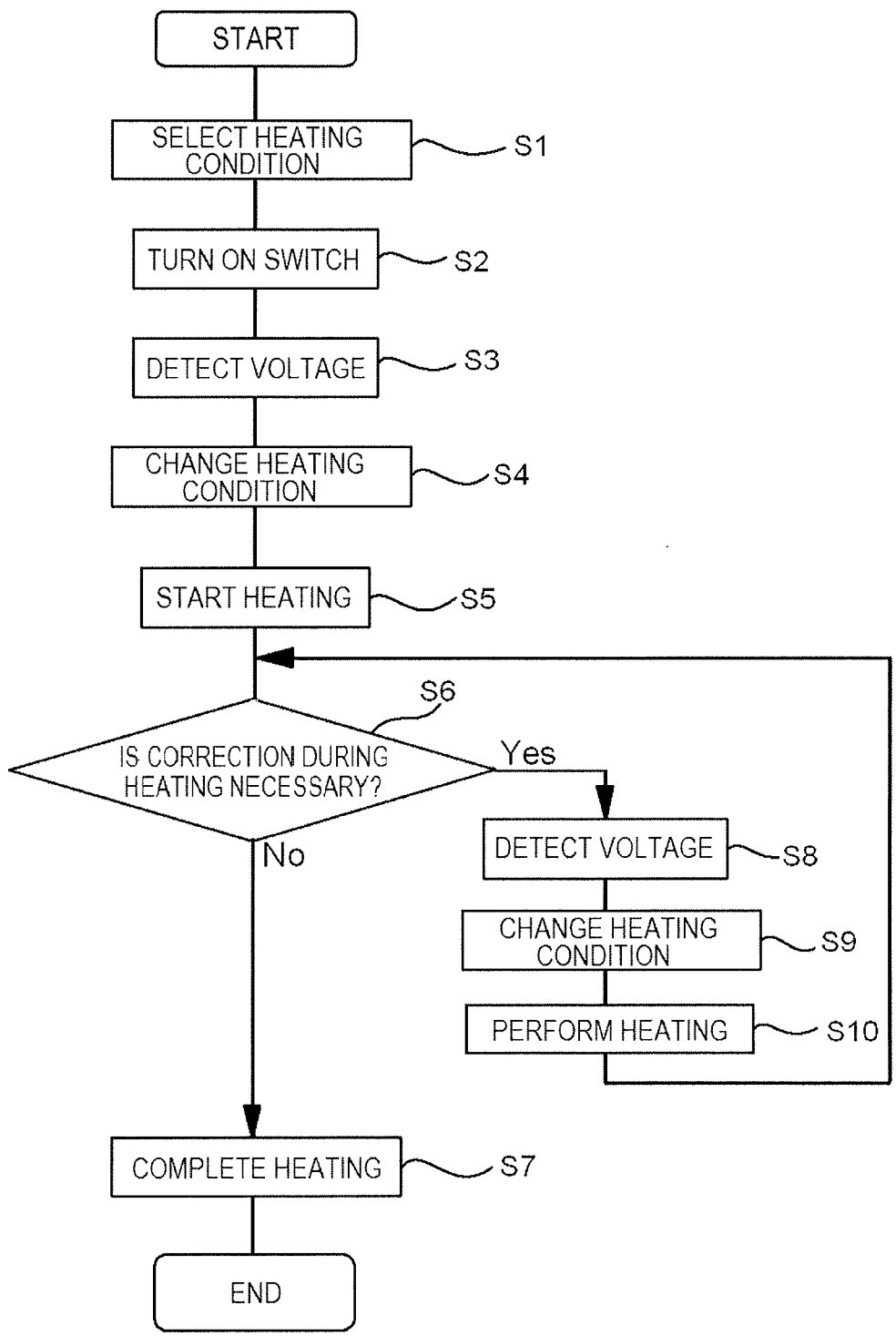
FIG. 5 is a flowchart illustrating a heating process according to an embodiment of the present invention.

FIG. 5 is a flowchart illustrating a heating process using the heating device 10, according to an embodiment of the present invention. First, from a plurality of heating conditions stored in the storage unit 22, the controller 20 selects an optimum heating condition in accordance with the supply voltage of the power supply unit 14, the diameter or type of the optical fibers 100a and 100b to be heated and reinforced, or the type of the reinforcing member 200 (step S1). Next, the controller 20 turns on the heating switch of the heater 12 (step S2).

After turning on the heating switch of the heater 12, the controller 20 causes the detecting unit 21 to detect a voltage applied to the heater 12 (step S3). The controller 20 then causes the condition instruction unit 23 to select an optimum heating condition from a plurality of different heating conditions stored in the storage unit 22, on the basis of the detected voltage (step S4).

Next, on the basis of the selected heating condition, the controller 20 applies a voltage to the heater 12 so as to heat the heater 12 to a predetermined heating temperature, and starts the process of heating the reinforcing member 200 (step S5). Next, the controller 20 determines whether it is necessary to reselect a heating condition during the heating (step S6). The necessity of reselection is determined on the basis of the amount of drop in the applied voltage during the heating. The voltage applied to the heater 12 tends to constantly decrease during heating by the heater 12. Therefore, if the amount of drop from a voltage at the initial stage of the heating process exceeds a predetermined threshold, it is necessary to reselect a heating condition for optimization.

If the amount of drop in the voltage applied to the heater 12 does not exceed the predetermined threshold during the heating, and thus there is no need to reselect a heating condition (NO in step S6), the controller 20 stops the application of voltage to the heater 12 after the elapse of a predetermined period of time according to the heating condition selected before the start of the heating. The heating is completed when the heater temperature drops to a predetermined value (ranging from 100° C. to about 150° C. which is around a softening temperature of the reinforcing member) (step S7). On the other hand, if it is necessary to reselect a heating condition (YES in step S6), the controller 20 detects a voltage at the point (step S8), causes the condition instruction unit 23 to reselect an optimum heating condition on the basis of the detected voltage (step S9), and continues the heating process under the reselected heating condition (step S10). Then, the controller 20 repeats the reselection of a heating condition in accordance with the amount of drop in the voltage applied to the heater 12, and stops the application of voltage to the heater 12 after the elapse of a predetermined period of time.

Figure 6:
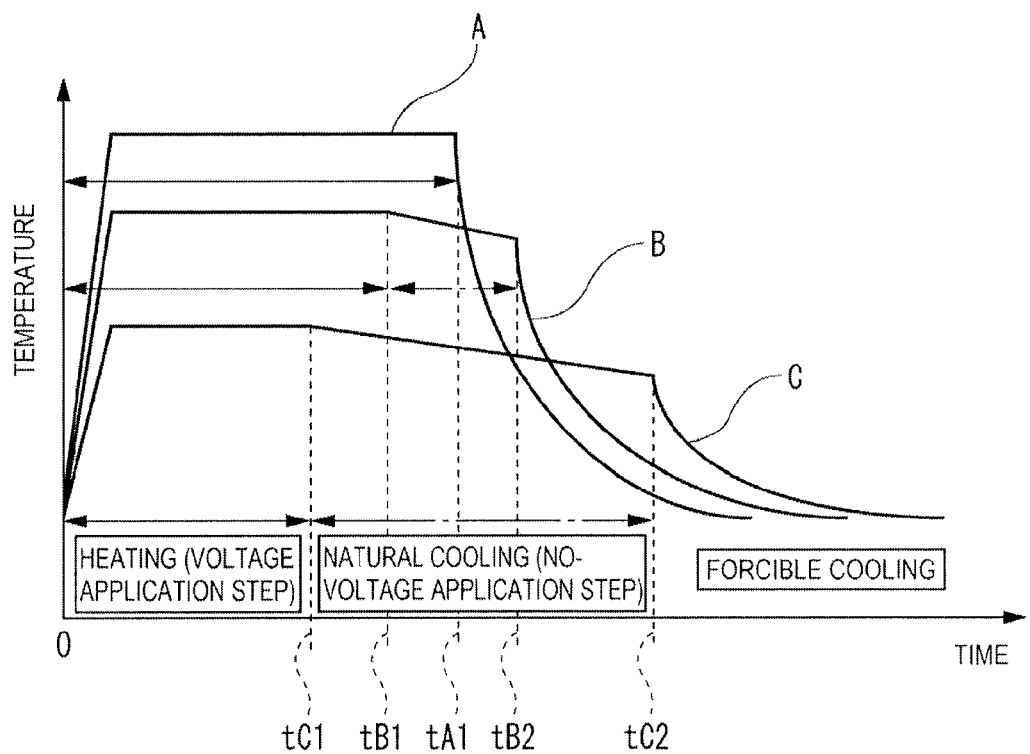
FIG. 6 is a graph showing how the temperature changes from the start to completion of the heating in FIG. 5.

FIG. 6 is a graph showing how the temperature changes from the start of heating (step S5) to the completion of heating (step S7) in FIG. 5. Curve A shows how the temperature changes during the heating process performed by the heating device 10 connected to a 13.8-V AC power supply. Curve B shows how the temperature changes during the heating process performed by the heating device 10 connected to an internal or external 11.8-V medium-voltage battery. Curve C shows how the temperature changes during the heating process performed by the heating device 10 connected to an internal or external 9-V low-voltage battery.

The heating process in which power is supplied from the AC power supply (see curve A) involves a voltage application step in which a voltage is applied to the heater 12 to heat the heater 12, for example, at 230° C. for 12 seconds. After the application of voltage to the heater 12 is stopped, a forcible cooling step is performed, in which the heater 12 is forcibly cooled down to a predetermined temperature by a predetermined cooling means. A no-voltage application step (described below) is not performed in the heating device 10 connected to the AC power supply.

In the heating process in which power is supplied from the medium-voltage battery (see curve B), the heater 12 is heated, for example, at 190° C. to 210° C. for 10 seconds by applying a voltage to the heater 12. Then, a no-voltage application step is performed, in which the application of voltage to the heater 12 is stopped to allow natural cooling, for example, for 10 seconds. During this step, the reinforcing member 200 continues to be heated and shrunk by the residual heat of the heater 12. Then, the heater 12 is forcibly cooled down to a predetermined temperature by a cooling means.

In the heating process in which power is supplied from the medium-voltage battery, since the heating temperature is lower than that in the case of supplying power from the AC power supply, it is necessary to increase the heating time of the heater 12 to sufficiently shrink the reinforcing member 200. However, increasing the duration of applying a voltage to the heater 12 leads to an increased amount of power consumption. As a solution to this, in the present embodiment, a voltage application period (0 to tB1) during which power is supplied from the medium-voltage battery is made shorter than a voltage application period (0 to tA1) during which power is supplied from the AC power supply, and a natural cooling period (tB1 to tB2) is provided to reduce the amount of power consumption. During the natural cooling period, the reinforcing member 200 is heated and shrunk by the residual heat of the heater 12.

In the heating process in which power is supplied from the low-voltage battery (see curve C), the heater 12 is heated, for example, at 160° C. to 180° C. for 8 seconds by applying a voltage to the heater 12. Then, the application of voltage to the heater 12 is stopped to allow natural cooling, for example, for 20 seconds. Then, the heater 12 is forcibly cooled down to a predetermined temperature by a cooling means.

In the heating process in which power is supplied from the low-voltage battery, since the heating temperature is lower than that in the case of supplying power from the medium-voltage battery, it is necessary to further increase the heating time of the heater 12 to sufficiently shrink the reinforcing member 200. In the present embodiment, a voltage application period (0 to tC1) during which power is supplied from the low-voltage battery is made shorter than the voltage application period (0 to tB1) during which power is supplied from the medium-voltage battery, and a natural cooling period (tC1 to tC2) longer than that in the case of supplying power from the medium-voltage battery is provided to reduce the amount of power consumption.

As shown in FIG. 6, a voltage application period for applying a voltage to the heater 12 is changed in accordance with a voltage supplied to the heating device 10. In the case of lower voltages, a no-voltage application step is provided to maintain the heating and shrinking of the reinforcing member 200 by using the residual heat. It is thus possible to reduce the amount of power consumption and shorten the processing time from the heating step to the cooling step.

Example 1

Table I shows a result of examples where the reinforcing member 200 covering the fusion-spliced portion 110 was heated and shrunk by the heating device 10.

TABLE I

| | | Heating conditions | | | | | | |
|---|---|---|---|---|---|---|---|---|
| | | Heating | | | | Natural cooling | Forcible cooling | |
| | V(V) | Tc (° C.) | tc (s) | Ts (° C.) | ts (s) | tn (s) | tf (s) | tr (s) |
| Comparative example 1 | 13.8 | 230 | 5 | 230 | 13 | | 5 | 29.15 |
| | 11.8 | | | | | | | 38.12 |
| | 11.0 | | | | | | | 47.9 |
| | 10.0 | | | | | | | 79.06 |
| | 9.0 | | | | | | | 97.28 |
| Example 1 | 13.8 | 230 | 5 | 230 | 13 | 0 | 5 | 29.15 |
| | 11.8 | 230 | | 230 | | | | 38.12 |
| | 11.0 | 215 | | 215 | | | | 35.4 |
| | 10.0 | 200 | | 200 | | | | 36.16 |
| | 9.0 | 185 | | 185 | | | | 38.02 |
| | 9.0 | 160 | | 160 | 8 | 8 | 0 | 41.95 to 47.19 |

In comparative example 1, although a voltage V applied to the heating device 10 was varied from 9 V to 13.8 V, the optimization of the heating condition for heating the heater 12 (including a heating temperature $T_c$ for heating a central portion, a voltage application period $t_c$ for applying a voltage to the central portion after the temperature $T_c$ was reached, a heating temperature $T_s$ for heating both end portions, a voltage application period $t_s$ for applying a voltage to both the end portions after the temperature $T_s$ was reached, a natural cooling period $t_n$, and a forcible cooling period $t_f$) according to the applied voltage V was not made and the same heating condition was used regardless of the voltage. Specifically, after the central portion of the heater 12 was heated at 230° C. for 5 seconds, both the end portions of the heater 12 were heated at 230° C. for 13 seconds. Thus, the reinforcing member 200 was heated and shrunk to carry out a reinforcing process. A heating and reinforcing period $t_r$, that is, the amount of time required from the start of application of voltage to the heater 12 until the heater 12 was cooled down to 150° C., was as shown in Table I. In comparative example 1, the lower the supply voltage, the longer it took for the temperature $T_c$ and the temperature $T_s$ to reach 230° C. and the longer the heating and reinforcing period.

On the other hand, in example 1, the heating condition was optimized in accordance with the voltage applied to the heating device 10, so as to heat and reinforce the reinforcing member 200. In example 1, there was a tendency for the heating and reinforcing period to slightly increase as the supply voltage decreased. However, the heating and reinforcing period required when the low-voltage battery was used was much shorter than that in comparative example 1.

As described above, the central portion and the end portions of the heater 12 were heated sequentially, not simultaneously. This is to allow melting of the adhesive tube 220 in the reinforcing member 200 to take place from the center toward both ends. Thus, air bubbles produced in and around the center of the fusion-spliced portion 110 can be pushed toward both ends, and air can be prevented from remaining in the reinforcing member 200.

Example 2

Next, an evaluation test similar to that for the reinforcing member 200 was performed using the fusion-spliced portion 110 covered with a reinforcing member 300. The reinforcing member 300 has dimensions different from those of the reinforcing member 20. The test result is shown in Table II.

TABLE II

| | | Heating conditions | | | | | |
|---|---|---|---|---|---|---|---|
| | | Heating | | | | Natural | Forcible |
| | V(V) | Tc (° C.) | tc (s) | Ts (° C.) | ts (s) | cooling tn (s) | cooling tf (s) | tr (s) |
| Comparative example 2 | 13.8 | 230 | 12 | 210 | 13 | | 5 | 33.41 |
| | 11.8 | | | | | | | 38.47 |
| | 11.0 | | | | | | | 45.93 |
| | 10.0 | | | | | | | 65.11 |
| | 9.0 | | | | | | | 85.94 |
| Example 2 | 13.8 | 230 | 12 | 210 | 13 | 0 | 5 | 33.4 |
| | 11.8 | 230 | 12 | 210 | 13 | | | 38.47 |
| | 11.0 | 225 | 13 | 205 | 14 | | | 44.46 |
| | 10.0 | 215 | 14 | 200 | 15 | | | 51.44 |
| | 9.0 | 205 | 15 | 195 | 16 | | | 63.08 |

In comparative example 2, although the supply voltage of a battery connected to the heating device 10 was varied from 9 V to 13.8 V as in comparative example 1, the heating condition for the reinforcing member 300 was the same regardless of the voltage. As a result, in comparative example 2, the heating and reinforcing period significantly increased as the supply voltage of the battery decreased, as shown in Table II.

On the other hand, in example 2, the heating condition for the reinforcing member 300 was optimized in accordance with the supply voltage (ranging from 9 V to 13.8 V) of the battery connected to the heating device 10 as in example 1, so as to heat and reinforce the reinforcing member 300. In example 2, there was a tendency for the heating and reinforcing period to slightly increase as the voltage decreased. However, the heating and reinforcing period required when the low-voltage battery was used was substantially shorter than that in comparative example 2.

Example 3

An evaluation test was performed to examine the relationship between the number of heating operations and the level of battery drain when the fusion-spliced portion 110 covered with the reinforcing member 300 was heated and reinforced by the heating device 10 connected to a low-voltage battery. In comparative example 3, the heating condition previously used (heating temperature $T_c$: 230° C., voltage application period $t_c$: 5 seconds, heating temperature $T_s$: 230° C., voltage application period $t_s$: 13 seconds, and natural cooling period: 0 seconds) was used. In example 3, an optimum heating condition for the low-voltage battery (heating temperature $T_c$: 210° C., voltage application period $t_c$: 5 seconds, heating temperature $T_s$: 210° C., voltage application period $t_s$: 8 seconds, and natural cooling period: 5 seconds) was used. Table III shows the result. In Table III, "remaining battery power" indicates the amount of remaining power in percentage relative to the power of the battery in a fully charged state.

TABLE III

| | Remaining battery power (%) | | | | | |
|---|---|---|---|---|---|---|
| | 90 | 70 | 50 | 30 | 10 | 0 |
| Comparative example 3 (condition unchanged) | 10 | 27 | 43 | 60 | 76 | 84 |
| Example 3 (condition corrected) | 11 | 34 | 56 | 77 | 98 | 115 |

The number of heating operations performed until the device cannot operate was 84 in comparative example 3, whereas it was 115 in example 3. This showed that by correcting and optimizing the heating condition in accordance with the voltage of the battery to be used, the number of operations per battery was increased and the operation efficiency was improved.

In the heating device 10, the condition instruction unit 23 selects any of a plurality of heating conditions in accordance with the amount of heat generation of the heater 12 detected on the basis of the voltage, and a voltage is applied to the heater 12 on the basis of the selected heating condition. This makes it possible to set an optimum heating condition for the power supply being used. Therefore, even when the heating device 10 is connected to a low-voltage battery, more heating operations can be performed on the reinforcing members 200 and 300 than before. Additionally, optimizing the amount of heating of the reinforcing members 200 and 300 can prevent the battery from running out before completion of the heating.

Although some embodiments of the present invention have been described, the present invention is not limited to the embodiments described above and may use other configurations as necessary. For example, the voltage may be detected after completion of the heating process (i.e., immediately after the completion of forcible cooling of the reinforcing members 200 and 300) to optimize the heating condition. In this case, the condition used in the next heating process can be optimized.

A current value, a resistance value, electric power, electric energy, or the like, instead of a voltage, may be used as a parameter. The current value can be determined by providing a detecting circuit in the heating device 10 or by dividing a voltage by a resistance value. The current value may be determined as the amount of current change by monitoring the amount of change in current flowing in the heater 12 during a given period of measurement. The resistance value can be determined on the basis of the amount of change in resistance of the heater 12 during a given period of measurement. The electric power can be determined by a relational expression of voltage, current, and resistance values, or can be determined from the amount of change in electric power. The electric energy can be determined by a relational expression of voltage, current, and resistance values and time, or can be determined from the amount of change in electric power. In the case of using any parameter, it can be determined that a high parameter value corresponds to a large amount of heat generation of the heater 12, and a low parameter value corresponds to a small amount of heat generation of the heater 12.

Figure 7:
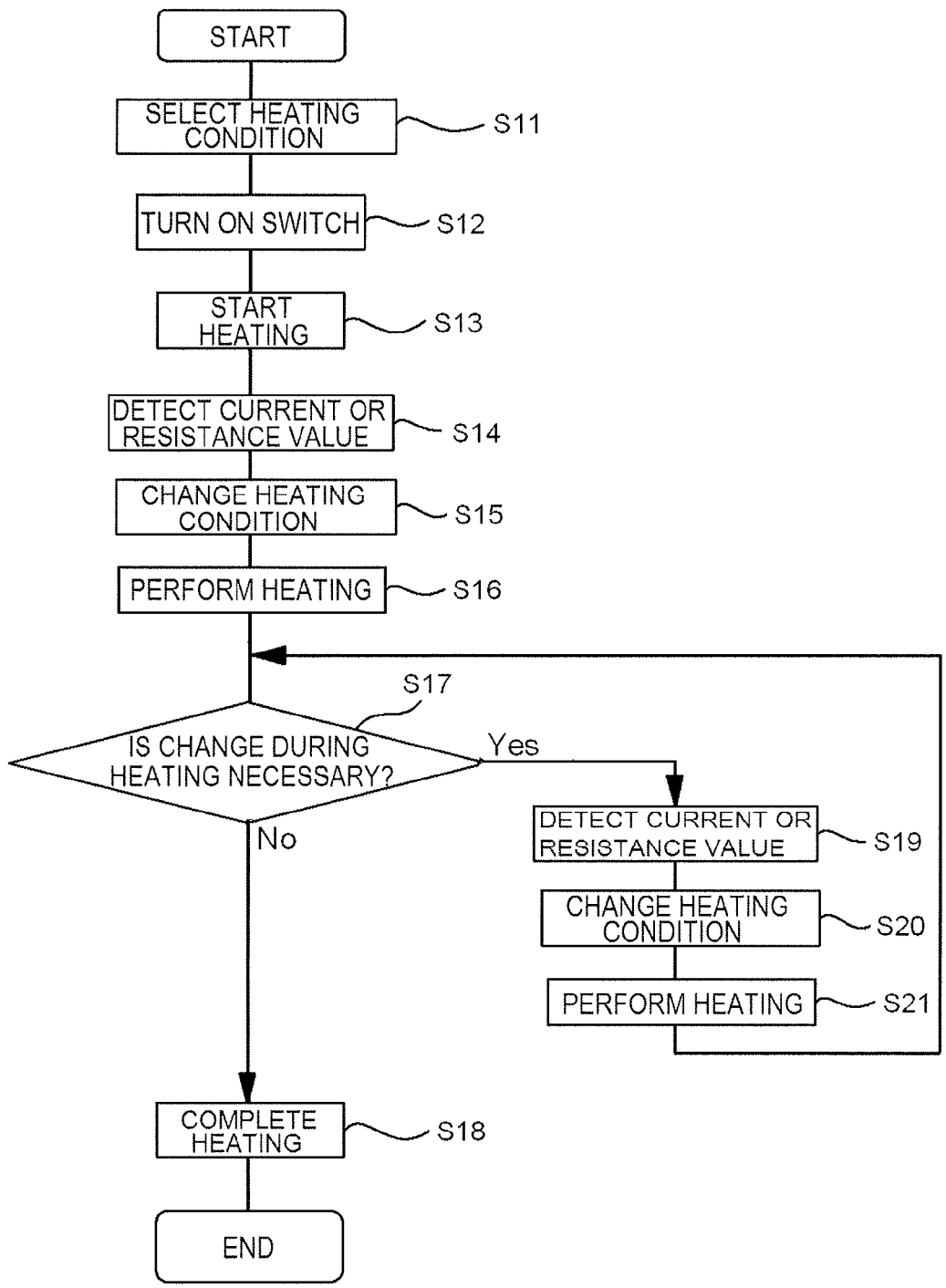
FIG. 7 is a flowchart illustrating a modification of the heating process according to the embodiment of the present invention.

FIG. 7 is a flowchart of a heating process in which a current or resistance value is used as a parameter. The controller 20 selects any of a plurality of different heating conditions stored in the storage unit 22 (step S11), and then turns on the heating switch of the heater 12 (step S12). Next, on the basis of the selected heating condition, the controller 20 applies a voltage to the heater 12 to heat the heater 12 to a predetermined heating temperature, and starts the process of heating the reinforcing member 200 (step S13).

After starting the heating, the controller 20 causes the detecting unit 21 to detect a value of current flowing to the heater 12 or a value of resistance of the heater 12 (step S14). To facilitate determination of the amount of heat generated by the heater 12, it is preferable that the current or resistance value be detected immediately after the heating by the heater 12. Then, on the basis of the detected current or resistance value, the controller 20 causes the condition instruction unit 23 to change the heating condition (step S15) and heats the reinforcing member 200 on the basis of the changed heating condition (step S16).

If there is no need to further change the heating condition during the heating (NO in step S17), the controller 20 stops the application of voltage to the heater 12 after the elapse of a predetermined period of time according to the heating condition changed in step S15. The heating is completed when the heater temperature drops to a predetermined value (ranging from 100° C. to about 150° C. which is around a softening temperature of the reinforcing member) (step S18). On the other hand, if it is necessary to change the heating condition (YES in step S17), the controller 20 detects a current or resistance value during the heating (step S19), changes the heating condition again on the basis of the detected current or resistance value (step S20), and continues the heating under the changed heating condition (step S21). Then, the controller 20 repeats the change of the heating condition in accordance with the amount of drop in the voltage applied to the heater 12, and stops the application of voltage to the heater 12 after the elapse of a predetermined period of time. With this configuration, the heating condition can be optimized by using a current or resistance value, instead of a voltage applied to the heater 12, as a parameter.

Figure 8:
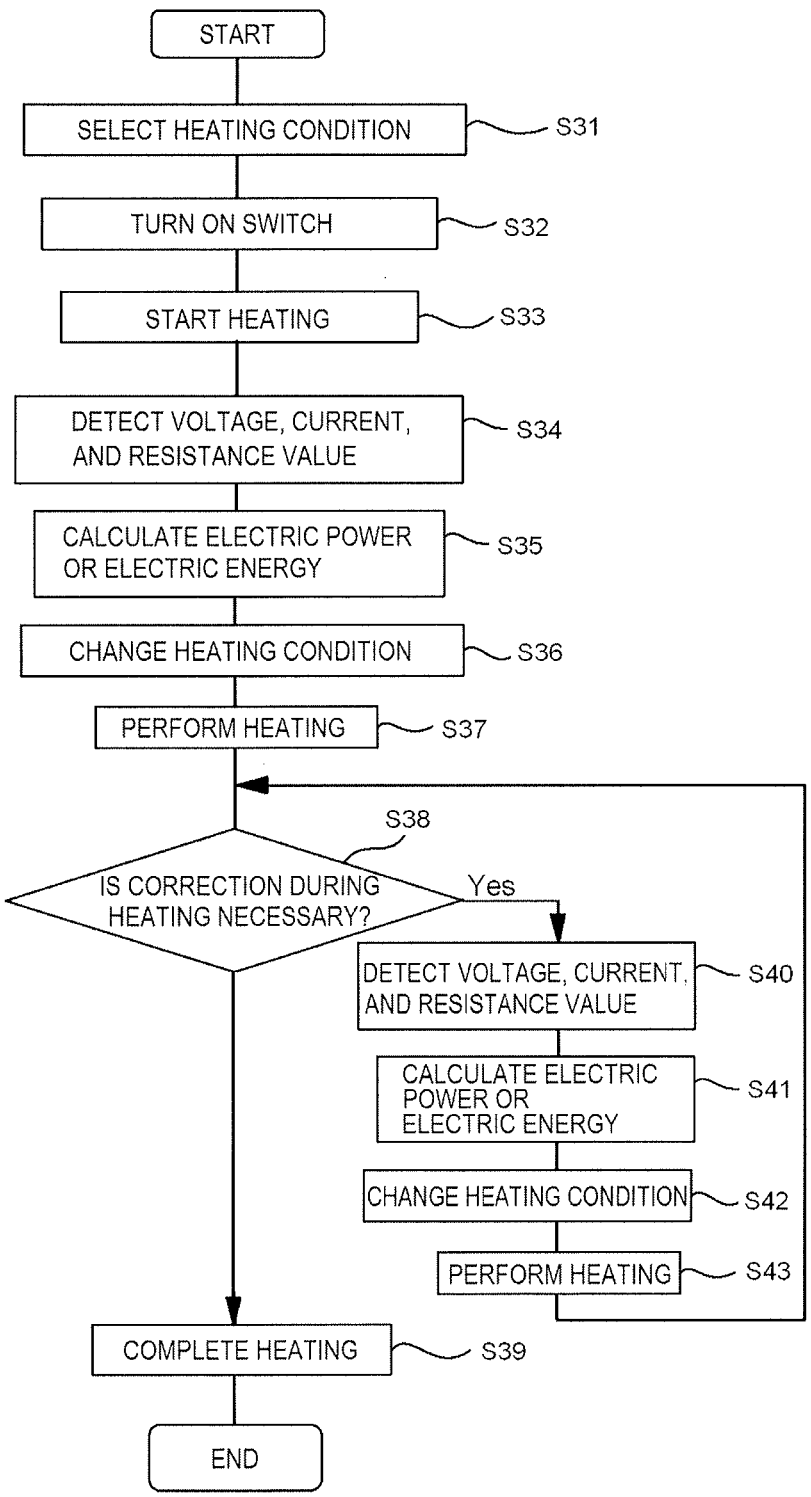
FIG. 8 is a flowchart illustrating another modification of the heating process according to the embodiment of the present invention.

FIG. 8 is a flowchart of a heating process in which electric power or electric energy is used as a parameter. The controller 20 selects any of a plurality of different heating conditions stored in the storage unit 22 (step S31), and then turns on the heating switch of the heater 12 (step S32). Next, on the basis of the selected heating condition, the controller 20 applies a voltage to the heater 12 to heat the heater 12 to a predetermined heating temperature, and starts the process of heating the reinforcing member 200 (step S33).

After starting the heating, the controller 20 causes the detecting unit 21 to detect values of voltage, current, and resistance in the heater 12 (step S34). On the basis of the detected values of voltage, current, and resistance, the controller 20 calculates electric power or electric energy (step S35). Then, on the basis of the calculated electric power or electric energy, the controller 20 causes the condition instruction unit 23 to change the heating condition (step S36), and heats the reinforcing member 200 on the basis of the changed heating condition (step S37).

If there is no need to further change the heating condition during the heating (NO in step S38), the controller 20 stops the application of voltage to the heater 12 after the elapse of a predetermined period of time according to the heating condition changed in step S36. The heating is completed when the heater temperature drops to a predetermined value (ranging from 100° C. to about 150° C. which is around a softening temperature of the reinforcing member) (step S39). On the other hand, if it is necessary to change the heating condition (YES in step S38), the controller 20 detects values of voltage, current, and resistance during the heating (step S40), and calculates electric power or electric energy on the basis of the detected values of voltage, current, and resistance (step S41). The controller 20 changes the heating condition again on the basis of the calculated electric power or electric energy (step S42), and continues the heating under the changed heating condition (step S43). Then, the controller 20 repeats the change of the heating condition in accordance with the amount of drop in the voltage applied to the heater 12, and stops the application of voltage to the heater 12 after the elapse of a predetermined period of time.

With this configuration, the heating condition can be optimized by using electric power or electric energy, instead of a voltage applied to the heater 12, as a parameter. For a heating condition to be selected as a target, data does not need to be individually stored in the form of a table. By using a predetermined approximate expression in which a parameter to be detected is defined as a variable, the target value may be determined by calculation each time the parameter is detected. To maintain a heating condition determined as a target, a commonly used control means may be used to control the heating condition.

INDUSTRIAL APPLICABILITY

The present invention is applicable to optical fiber fusion splicers used in outdoor line construction sites.

The invention claimed is:

1. A heating device for an optical fiber reinforcing member, comprising:
   a fiber holder configured to hold optical fibers covered with the reinforcing member at a fusion-spliced portion;
   a heater configured to heat the reinforcing member;
   a power supply unit configured to apply a voltage to the heater; and a controller configured to control the voltage, the controller including
- a detecting unit that detects a parameter for determining the amount of heat generation of the heater, the parameter being a voltage applied to the heater or a supply voltage of the power supply unit,
- a storage unit that stores a plurality of heating conditions, and
- a condition instruction unit that selects any of the plurality of heating conditions in accordance with a value of the parameter and instructs the power supply unit to apply a voltage to the heater on the basis of the selected heating condition.

2. The heating device according to claim 1, further comprising cooling means for cooling the heater,
wherein the heating condition includes, in sequence, a condition in a voltage application step of applying a voltage to the heater, a condition in a no-voltage application step of applying no voltage to the heater to allow natural cooling of the reinforcing member, and a condition in a cooling step of forcibly cooling the reinforcing member with the cooling means.

3. An optical fiber fusion splicer comprising the heating device according to claim 1.

4. A heating method for heating an optical fiber reinforcing member, the heating method being a method in which the reinforcing member that protects a fusion-spliced portion of optical fibers is heated and reinforced by a heater, the heating method comprising:
applying a voltage to the heater on the basis of any of a plurality of heating conditions;
detecting a parameter for determining the amount of heat generation of the heater, the parameter being a voltage applied to the heater or a supply voltage of the power supply unit;
selecting any of the plurality of heating conditions in accordance with a value of the parameter; and
applying a voltage to the heater on the basis of the selected heating condition so as to heat and reinforce the reinforcing member.

5. The heating device according to claim 1, further comprising cooling means for cooling the heater,
wherein the heating condition includes, in sequence, a condition in a voltage application step of applying a voltage to the heater, a condition in a no-voltage application step of applying no voltage to the heater to allow natural cooling of the reinforcing member, and a condition in a cooling step of forcibly cooling the reinforcing member with the cooling means.

6. The heating method according to claim 4,
wherein the selecting any of the plurality of heating conditions comprises calculating a target value as the selected heating condition by using an approximate expression in which the parameter is defined as a variable.

7. A heating device for an optical fiber reinforcing member, comprising:
a fiber holder configured to hold optical fibers covered with the reinforcing member at a fusion-spliced portion;
a heater configured to heat the reinforcing member;
a power supply unit configured to apply a voltage to the heater; and
a controller configured to control the voltage, the controller including
- a detecting unit that detects a parameter for determining the amount of heat generation of the heater, the parameter being a voltage applied to the heater or a supply voltage of the power supply unit,
- a storage unit that stores an approximate expression in which the parameter is defined as a variable, and
- a condition instruction unit that calculates a target value as a selected heating condition in accordance with a value of the parameter and instructs the power supply unit to apply a voltage to the heater on the basis of the selected heating condition.

8. The heating device according to claim 7, further comprising cooling means for cooling the heater,
wherein the heating condition includes, in sequence, a condition in a voltage application step of applying a voltage to the heater, a condition in a no-voltage application step of applying no voltage to the heater to allow natural cooling of the reinforcing member, and a condition in a cooling step of forcibly cooling the reinforcing member with the cooling means.

9. An optical fiber fusion splicer comprising the heating device according to claim 7.

* * * * *